(12) United States Patent
Schofield

(10) Patent No.: US 10,099,610 B2
(45) Date of Patent: Oct. 16, 2018

(54) DRIVER ASSISTANCE SYSTEM FOR A VEHICLE

(71) Applicant: MAGNA ELECTRONICS INC., Auburn Hills, MI (US)

(72) Inventor: Kenneth Schofield, Holland, MI (US)

(73) Assignee: MAGNA ELECTRONICS INC., Auburn Hills, MI (US)

(*) Notice: Subject to any disclaimer, the term of this patent is extended or adjusted under 35 U.S.C. 154(b) by 122 days.

(21) Appl. No.: 15/289,341

(22) Filed: Oct. 10, 2016

(65) Prior Publication Data

US 2017/0028916 A1     Feb. 2, 2017

Related U.S. Application Data

(63) Continuation of application No. 14/997,831, filed on Jan. 18, 2016, now Pat. No. 9,463,744, which is a
(Continued)

(51) Int. Cl.
*G08G 1/16*     (2006.01)
*B60Q 9/00*     (2006.01)
(Continued)

(52) U.S. Cl.
CPC ............ *B60Q 9/008* (2013.01); *B60Q 1/346* (2013.01); *B60R 1/00* (2013.01); *B60R 11/04* (2013.01);
(Continued)

(58) Field of Classification Search
None
See application file for complete search history.

(56) References Cited

U.S. PATENT DOCUMENTS

| 4,200,361 A | 4/1980 | Malvano |
| 4,214,266 A | 7/1980 | Myers |

(Continued)

FOREIGN PATENT DOCUMENTS

| EP | 0353200 | 1/1990 |
| EP | 0426503 | 5/1991 |

(Continued)

OTHER PUBLICATIONS

Achler et al., "Vehicle Wheel Detector using 2D Filter Banks," IEEE Intelligent Vehicles Symposium of Jun. 2004.
(Continued)

*Primary Examiner* — Brent Swarthout
(74) *Attorney, Agent, or Firm* — Honigman Miller Schwartz and Cohn, LLP

(57) ABSTRACT

A driver assistance system for a vehicle includes a vision system, a sensing system and a control. The vision system includes a camera and the sensing system includes a radar sensor. Image data captured by the camera is provided to the control and is processed by an image processor of the control. Responsive to image processing of captured image data, lane markers on the road being traveled along by the equipped vehicle are detected and the control determines a lane being traveled by the equipped vehicle. Radar data generated by the radar sensor is provided to the control, which receives vehicle data relating to the equipped vehicle via a vehicle bus of the equipped vehicle. Responsive at least in part to processing of generated radar data and captured image data, the control detects another vehicle present on the road being traveled along by the equipped vehicle.

37 Claims, 5 Drawing Sheets

Related U.S. Application Data continuation of application No. 13/919,483, filed on Jun. 17, 2013, now Pat. No. 9,245,448, which is a continuation of application No. 12/483,996, filed on Jun. 12, 2009, now Pat. No. 8,466,806, which is a continuation of application No. 12/058,155, filed on Mar. 28, 2008, now Pat. No. 7,551,103, which is a continuation of application No. 11/735,782, filed on Apr. 16, 2007, now Pat. No. 7,355,524, which is a continuation of application No. 11/108,474, filed on Apr. 18, 2005, now Pat. No. 7,205,904, which is a continuation of application No. 10/209,173, filed on Jul. 31, 2002, now Pat. No. 6,882,287.

(60) Provisional application No. 60/309,022, filed on Jul. 31, 2001.

(51) Int. Cl.
| | | |
|---|---|---|
| *B60Q 1/34* | (2006.01) | |
| *B62D 15/02* | (2006.01) | |
| *G01S 13/93* | (2006.01) | |
| *B60R 1/00* | (2006.01) | |
| *B60R 11/04* | (2006.01) | |
| *G06K 9/00* | (2006.01) | |
| *G06K 9/62* | (2006.01) | |
| *H04N 5/247* | (2006.01) | |

(52) U.S. Cl.
CPC .......... *B62D 15/029* (2013.01); *G01S 13/931* (2013.01); *G06K 9/00798* (2013.01); *G06K 9/00805* (2013.01); *G06K 9/6267* (2013.01); *G08G 1/163* (2013.01); *G08G 1/167* (2013.01); *H04N 5/247* (2013.01); *B60R 2300/804* (2013.01); *B60T 2201/08* (2013.01); *B60T 2201/089* (2013.01); *G01S 2013/936* (2013.01); *G01S 2013/9325* (2013.01); *G01S 2013/9332* (2013.01); *G01S 2013/9353* (2013.01); *G01S 2013/9364* (2013.01); *G01S 2013/9367* (2013.01); *G01S 2013/9385* (2013.01)

(56) References Cited

U.S. PATENT DOCUMENTS

| | | |
|---|---|---|
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |
| 4,254,931 A | 3/1981 | Aikens |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,348,652 A | 9/1982 | Barnes et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,521,804 A | 6/1985 | Bendell |
| 4,529,275 A | 7/1985 | Ballmer |
| 4,529,873 A | 7/1985 | Ballmer |
| 4,532,550 A | 7/1985 | Bendell et al. |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,600,913 A | 7/1986 | Caine |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,638,287 A | 1/1987 | Umebayashi et al. |
| 4,645,975 A | 2/1987 | Meitzler et al. |
| 4,647,161 A | 3/1987 | Müller |
| 4,653,316 A | 3/1987 | Fukuhara |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith |
| 4,731,669 A | 3/1988 | Hayashi et al. |
| 4,741,603 A | 5/1988 | Miyagi |
| 4,758,883 A | 7/1988 | Kawahara et al. |
| 4,768,135 A | 8/1988 | Kretschmer et al. |
| 4,772,942 A | 9/1988 | Tuck |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,855,822 A | 8/1989 | Narendra et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,907,870 A | 3/1990 | Brucker |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,975,703 A | 12/1990 | Delisle et al. |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,075,768 A | 12/1991 | Wirtz et al. |
| 5,086,253 A | 2/1992 | Lawler |

(56) References Cited

U.S. PATENT DOCUMENTS

| | | |
|---|---|---|
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,166,681 A | 11/1992 | Bottesch et al. |
| 5,168,378 A | 12/1992 | Black |
| 5,170,374 A | 12/1992 | Shimohigashi et al. |
| 5,172,235 A | 12/1992 | Wilm et al. |
| 5,177,606 A | 1/1993 | Koshizawa |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,225,827 A | 7/1993 | Persson |
| 5,245,422 A | 9/1993 | Borcherts et al. |
| 5,253,109 A | 10/1993 | O'Farrell |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,339,075 A | 8/1994 | Abst et al. |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,434,927 A | 7/1995 | Brady et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,467,284 A | 11/1995 | Yoshioka et al. |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,612,883 A | 3/1997 | Shaffer et al. |
| 5,614,788 A | 3/1997 | Mullins |
| 5,619,370 A | 4/1997 | Guinosso |
| 5,634,709 A | 6/1997 | Iwama |
| 5,642,299 A | 6/1997 | Hardin et al. |
| 5,646,612 A | 7/1997 | Byon |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A | 9/1997 | Schofield et al. |
| 5,673,019 A | 9/1997 | Dantoni |
| 5,675,489 A | 10/1997 | Pomerleau |
| 5,677,851 A | 10/1997 | Kingdon et al. |
| 5,680,123 A | 10/1997 | Lee |
| 5,699,044 A | 12/1997 | Van Lente et al. |
| 5,699,057 A | 12/1997 | Ikeda et al. |
| 5,715,093 A | 2/1998 | Schierbeek et al. |
| 5,724,187 A | 3/1998 | Varaprasad et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayer |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A | 7/1999 | Stam et al. |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,964,822 A | 10/1999 | Alland et al. |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |

(56) References Cited

U.S. PATENT DOCUMENTS

| | | |
|---|---|---|
| 6,001,486 A | 12/1999 | Varaprasad et al. |
| 6,009,336 A | 12/1999 | Harris et al. |
| 6,020,704 A | 2/2000 | Buschur |
| 6,031,484 A | 2/2000 | Bullinger et al. |
| 6,037,860 A | 3/2000 | Zander et al. |
| 6,037,975 A | 3/2000 | Aoyama |
| 6,049,171 A | 4/2000 | Stam et al. |
| 6,057,754 A | 5/2000 | Kinoshita et al. |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |
| 6,097,024 A | 8/2000 | Stam et al. |
| 6,107,939 A | 8/2000 | Sorden |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,151,539 A | 11/2000 | Bergholz et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,201,642 B1 | 3/2001 | Bos |
| 6,222,447 B1 | 4/2001 | Schofield et al. |
| 6,222,460 B1 | 4/2001 | DeLine et al. |
| 6,226,592 B1 * | 5/2001 | Luckscheiter et al. ....... 701/301 |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,278,377 B1 | 8/2001 | DeLine et al. |
| 6,281,806 B1 | 8/2001 | Smith et al. |
| 6,285,393 B1 | 9/2001 | Shimoura et al. |
| 6,291,906 B1 | 9/2001 | Marcus et al. |
| 6,292,752 B1 | 9/2001 | Franke et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,311,119 B2 | 10/2001 | Sawamoto et al. |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,324,450 B1 | 11/2001 | Iwama |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,360,170 B1 * | 3/2002 | Ishikawa et al. ............. 340/903 |
| 6,362,729 B1 | 3/2002 | Hellmann et al. |
| 6,363,326 B1 | 3/2002 | Scully |
| 6,366,213 B2 | 4/2002 | DeLine et al. |
| 6,366,236 B1 | 4/2002 | Farmer et al. |
| 6,370,329 B1 | 4/2002 | Teuchert |
| 6,388,565 B1 | 5/2002 | Bernhard et al. |
| 6,388,580 B1 | 5/2002 | Graham et al. |
| 6,396,397 B1 | 5/2002 | Bos et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,433,817 B1 | 8/2002 | Guerra |
| 6,441,748 B1 | 8/2002 | Takagi et al. |
| 6,442,465 B2 | 8/2002 | Breed et al. |
| 6,477,464 B2 | 11/2002 | McCarthy et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,683,969 B1 | 1/2004 | Nishigaki et al. |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,728,623 B2 | 4/2004 | Takenaga et al. |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,784,828 B2 | 8/2004 | Delcheccolo et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,813,370 B1 | 11/2004 | Arai |
| 6,822,563 B2 | 11/2004 | Bos et al. |
| 6,823,241 B2 | 11/2004 | Shirato et al. |
| 6,824,281 B2 | 11/2004 | Schofield |
| 6,831,261 B2 | 12/2004 | Schofield et al. |
| 6,847,487 B2 | 1/2005 | Burgner |
| 6,873,253 B2 | 3/2005 | Veriris |
| 6,882,287 B2 * | 4/2005 | Schofield ...................... 340/903 |
| 6,888,447 B2 | 5/2005 | Hori et al. |
| 6,889,161 B2 | 5/2005 | Winner et al. |
| 6,891,563 B2 | 5/2005 | Schofield et al. |
| 6,906,639 B2 | 6/2005 | Lemelson et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,046,448 B2 | 5/2006 | Burgner |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |

(56) References Cited

U.S. PATENT DOCUMENTS

| | | |
|---|---|---|
| 7,167,796 B2 | 1/2007 | Taylor et al. |
| 7,195,381 B2 | 3/2007 | Lynam et al. |
| 7,202,776 B2 | 4/2007 | Breed |
| 7,205,904 B2 * | 4/2007 | Schofield ............ 340/903 |
| 7,224,324 B2 | 5/2007 | Quist et al. |
| 7,227,459 B2 | 6/2007 | Bos et al. |
| 7,227,611 B2 | 6/2007 | Hull et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,355,524 B2 * | 4/2008 | Schofield ............ 340/903 |
| 7,360,932 B2 | 4/2008 | Uken et al. |
| 7,370,983 B2 | 5/2008 | DeWind et al. |
| 7,375,803 B1 | 5/2008 | Bamji |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,248 B2 | 9/2008 | Schofield et al. |
| 7,423,821 B2 | 9/2008 | Bechtel et al. |
| 7,425,076 B2 | 9/2008 | Schofield et al. |
| 7,459,664 B2 | 12/2008 | Schofield et al. |
| 7,526,103 B2 | 4/2009 | Schofield et al. |
| 7,541,743 B2 | 6/2009 | Salmeen et al. |
| 7,551,103 B2 * | 6/2009 | Schofield ............ 340/903 |
| 7,561,181 B2 | 7/2009 | Schofield et al. |
| 7,565,006 B2 | 7/2009 | Stam et al. |
| 7,616,781 B2 | 11/2009 | Schofield et al. |
| 7,619,508 B2 | 11/2009 | Lynam et al. |
| 7,633,383 B2 | 12/2009 | Dunsmoir et al. |
| 7,639,149 B2 | 12/2009 | Katoh |
| 7,655,894 B2 | 2/2010 | Schofield et al. |
| 7,676,087 B2 | 3/2010 | Dhua et al. |
| 7,720,580 B2 | 5/2010 | Higgins-Luthman |
| 7,792,329 B2 | 9/2010 | Schofield et al. |
| 7,843,451 B2 | 11/2010 | Lafon |
| 7,855,778 B2 | 12/2010 | Yung et al. |
| 7,859,565 B2 | 12/2010 | Schofield et al. |
| 7,877,175 B2 | 1/2011 | Higgins-Luthman |
| 7,881,496 B2 | 2/2011 | Camilleri |
| 7,914,187 B2 | 3/2011 | Higgins-Luthman et al. |
| 7,930,160 B1 | 4/2011 | Hosagrahara et al. |
| 7,991,522 B2 | 8/2011 | Higgins-Luthman |
| 7,994,462 B2 | 8/2011 | Schofield et al. |
| 8,017,898 B2 | 9/2011 | Lu et al. |
| 8,095,310 B2 | 1/2012 | Taylor et al. |
| 8,098,142 B2 | 1/2012 | Schofield et al. |
| 8,203,440 B2 | 6/2012 | Schofield et al. |
| 8,222,588 B2 | 7/2012 | Schofield et al. |
| 8,224,031 B2 | 7/2012 | Saito |
| 8,314,689 B2 | 11/2012 | Schofield et al. |
| 8,324,552 B2 | 12/2012 | Schofield et al. |
| 8,386,114 B2 | 2/2013 | Higgins-Luthman et al. |
| 8,466,806 B2 * | 6/2013 | Schofield ............ 340/903 |
| 9,245,448 B2 * | 1/2016 | Schofield ............ 340/903 |
| 9,463,744 B2 * | 10/2016 | Schofield ............ 340/903 |
| 2001/0031068 A1 * | 10/2001 | Ohta ............ G01C 3/08 382/103 |
| 2001/0034575 A1 | 10/2001 | Takenaga et al. |
| 2001/0056326 A1 | 12/2001 | Kirmura |
| 2002/0005778 A1 | 1/2002 | Breed |
| 2002/0113873 A1 | 8/2002 | Williams |
| 2002/0116126 A1 | 8/2002 | Lin |
| 2002/0159270 A1 | 10/2002 | Lynam et al. |
| 2003/0016143 A1 | 1/2003 | Ghazarian |
| 2003/0025597 A1 | 2/2003 | Schofield |
| 2003/0137586 A1 | 7/2003 | Lewellen |
| 2003/0222982 A1 | 12/2003 | Hamdan et al. |
| 2004/0016870 A1 | 1/2004 | Pawlicki et al. |
| 2004/0164228 A1 | 8/2004 | Fogg et al. |
| 2005/0046978 A1 | 3/2005 | Schofield et al. |
| 2005/0219852 A1 | 10/2005 | Stam et al. |
| 2005/0237385 A1 | 10/2005 | Kosaka et al. |
| 2006/0018511 A1 | 1/2006 | Stam et al. |
| 2006/0018512 A1 | 1/2006 | Stam et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0250501 A1 | 11/2006 | Wildmann et al. |
| 2007/0104476 A1 | 5/2007 | Yasutomi et al. |
| 2007/0109406 A1 | 5/2007 | Schofield et al. |
| 2007/0120657 A1 | 5/2007 | Schofield et al. |
| 2007/0242339 A1 | 10/2007 | Bradley |
| 2008/0147321 A1 | 6/2008 | Howard et al. |
| 2008/0192132 A1 | 8/2008 | Bechtel et al. |
| 2009/0113509 A1 | 4/2009 | Tseng et al. |
| 2009/0160987 A1 | 6/2009 | Bechtel et al. |
| 2009/0190015 A1 | 7/2009 | Bechtel et al. |
| 2009/0256938 A1 | 10/2009 | Bechtel et al. |
| 2012/0045112 A1 | 2/2012 | Lundblad et al. |

FOREIGN PATENT DOCUMENTS

| | | |
|---|---|---|
| EP | 0492591 | 7/1992 |
| EP | 0640903 | 3/1995 |
| EP | 0788947 | 8/1997 |
| EP | 1074430 | 2/2001 |
| JP | 59114139 | 7/1984 |
| JP | 6079889 | 5/1985 |
| JP | 6080953 | 5/1985 |
| JP | 6272245 | 5/1987 |
| JP | S62131837 | 6/1987 |
| JP | 6414700 | 1/1989 |
| JP | 03099952 | 4/1991 |
| JP | 4114587 | 4/1992 |
| JP | H04127280 | 4/1992 |
| JP | 0577657 | 3/1993 |
| JP | 05050883 | 3/1993 |
| JP | 5213113 | 8/1993 |
| JP | 6227318 | 8/1994 |
| JP | 06267304 | 9/1994 |
| JP | 06276524 | 9/1994 |
| JP | 06295601 | 10/1994 |
| JP | 07004170 | 1/1995 |
| JP | 0732936 | 2/1995 |
| JP | 0747878 | 2/1995 |
| JP | 07052706 | 2/1995 |
| JP | 0769125 | 3/1995 |
| JP | 07105496 | 4/1995 |
| JP | 2630604 | 7/1997 |
| JP | 200274339 | 3/2002 |
| JP | 2003083742 | 3/2003 |
| JP | 20041658 | 1/2004 |
| WO | WO1994019212 | 2/1994 |
| WO | WO1996038319 | 12/1996 |

OTHER PUBLICATIONS

Borenstein et al., "Where am I? Sensors and Method for Mobile Robot Positioning", University of Michigan, Apr. 1996, pp. 2, 125-128.

Bow, Sing T., "Pattern Recognition and Image Preprocessing (Signal Processing and Communications)", CRC Press, Jan. 15, 2002, pp. 557-559.

Broggi et al., "Automatic Vehicle Guidance: The Experience of the ARGO Vehicle", World Scientific Publishing Co., 1999.

Broggi et al., "Multi-Resolution Vehicle Detection using Artificial Vision," IEEE Intelligent Vehicles Symposium of Jun. 2004.

Kastrinaki et al., "A survey of video processing techniques for traffic applications".

Mei Chen et al., AURORA: A Vision-Based Roadway Departure Warning System, The Robotics Institute, Carnegie Mellon University, published Aug. 9, 1995.

Parker (ed.), McGraw-Hill Dictionary of Scientific and Technical Terms Fifth Edition (1993).

Philomin et al., "Pedestrain Tracking from a Moving Vehicle".

(56) References Cited

OTHER PUBLICATIONS

Pratt, "Digital Image Processing, Passage—ED.3", John Wiley & Sons, US, Jan. 1, 2001, pp. 657-659, XP002529771.
Sun et al., "On-road vehicle detection using optical sensors: a review".
Tokimaru et al., "CMOS Rear-View TV System with CCD Camera", National Technical Report vol. 34, No. 3, pp. 329-336, Jun. 1988 (Japan).
Van Leeuwen et al., "Motion Estimation with a Mobile Camera for Traffic Applications", IEEE, US, vol. 1, Oct. 3, 2000, pp. 58-63.
Van Leeuwen et al., "Motion Interpretation for In-Car Vision Systems", IEEE, US, vol. 1, Sep. 30, 2002, p. 135-140.
Van Leeuwen et al., "Real-Time Vehicle Tracking in Image Sequences", IEEE, US, vol. 3, May 21, 2001, pp. 2049-2054, XP010547308.
Van Leeuwen et al., "Requirements for Motion Estimation in Image Sequences for Traffic Applications", IEEE, US, vol. 1, May 24, 1999, pp. 145-150, XP010340272.
Vellacott, Oliver, "CMOS in Camera," IEE Review, pp. 111-114 (May 1994).
Vlacic et al., (Eds), "Intelligent Vehicle Tecnologies, Theory and Applications", Society of Automotive Engineers Inc., edited by SAE International, 2001.
Wang et al., CMOS Video Cameras, article, 1991, 4 pages, University of Edinburgh, UK.
Zheng et al., "An Adaptive System for Traffic Sign Recognition," IEEE Proceedings of the Intelligent Vehicles '94 Symposium, pp. 165-170 (Oct. 1994).

\* cited by examiner

DRIVER ASSISTANCE SYSTEM FOR A VEHICLE

CROSS-REFERENCE TO RELATED APPLICATIONS

This application is a continuation of U.S. patent application Ser. No. 14/997,831, filed Jan. 18, 2016, now U.S. Pat. No. 9,463,744, which is a continuation of U.S. patent application Ser. No. 13/919,483, filed Jun. 17, 2013, now U.S. Pat. No. 9,245,448, which is a continuation of U.S. patent application Ser. No. 12/483,996, filed Jun. 12, 2009, now U.S. Pat. No. 8,466,806, which is a continuation of U.S. patent application Ser. No. 12/058,155, filed Mar. 28, 2008, now U.S. Pat. No. 7,551,103, which is a continuation of U.S. patent application Ser. No. 11/735,782, filed Apr. 16, 2007, now U.S. Pat. No. 7,355,524, which is a continuation of U.S. patent application Ser. No. 11/108,474, filed Apr. 18, 2005, now U.S. Pat. No. 7,205,904, which is a continuation of U.S. patent application Ser. No. 10/209,173, filed on Jul. 31, 2002, now U.S. Pat. No. 6,882,287, which claims priority from U.S. provisional application Ser. No. 60/309,022, filed on Jul. 31, 2001, the disclosures of which are hereby incorporated herein by reference in their entireties.

TECHNICAL FIELD OF INVENTION

This invention relates to object detection adjacent a motor vehicle as it travels along a highway, and more particularly relates to imaging systems that view the blind spot adjacent a vehicle and/or that view the lane adjacent the side of a vehicle and/or view the lane behind or forward the vehicle as it travels down a highway.

BACKGROUND OF INVENTION

Camera-based systems have been proposed, such as in commonly assigned patent application Ser. No. 09/372,915, filed Aug. 12, 1999, now U.S. Pat. No. 6,396,397, the disclosure of which is hereby incorporated herein by reference, that detect and display the presence, position of, distance to and rate of approach of vehicles, motorcycles, bicyclists, and the like, approaching a vehicle such as approaching from behind to overtake in a side lane to the vehicle. The image captured by such vehicular image capture systems can be displayed as a real-time image or by icons on a video screen, and with distances, rates of approach and object identifiers being displayed by indicia and/or overlays, such as is disclosed in U.S. Pat. Nos. 5,670,935; 5,949,331 and 6,222,447, the disclosures of which are hereby incorporated herein by reference. Such prior art systems work well. However, it is desirable for a vehicle driver to have visual access to the full 360 degrees surrounding the vehicle. It is not uncommon, however, for a vehicle driver to experience blind spots due to the design of the vehicle bodywork, windows and the rearview mirror system. A blind spot commonly exists between the field of view available to the driver through the exterior rearview mirror and the driver's peripheral limit of sight. Blind Spot Detection Systems (BSDS), in which a specified zone, or set of zones in the proximity of the vehicle, is monitored for the presence of other road users or hazardous objects, have been developed. A typical BSDS may monitor at least one zone approximately one traffic lane wide on the left- or right-hand side of the vehicle, and generally from the driver's position to approximately 10 m rearward. The objective of these systems is to provide the driver an indication of the presence of other road users located in the targeted blind spot.

Imaging systems have been developed in the prior art, such as discussed above, to perform this function, providing a visual, audio or tactile warning to the driver should a lane change or merge maneuver be attempted when another road user or hazard is detected within the monitored zone or zones. These systems are typically used in combination with a system of rearview mirrors in order to determine if a traffic condition suitable for a safe lane change maneuver exists. They are particularly effective when the detected object is moving at a low relative velocity with reference to the detecting vehicle, since the detected object may spend long periods of time in the blind spot and the driver may lose track of surrounding objects. However, prior art systems are inadequate in many driving conditions.

Known lane departure warning systems typically rely on visually detecting markers on the road on both sides of the vehicle for lane center determination. These markers must be fairly continuous or frequently occurring and generally must exist on both sides of the vehicle for the lane center position to be determined. Failure to detect a marker usually means failure of the departure-warning algorithm to adequately recognize a lane change event.

SUMMARY OF THE INVENTION

The present invention provides a Lane Change Aid (LCA) system wherein the driver of a motor vehicle traveling along a highway is warned if any unsafe lane change or merge maneuver is attempted, regardless of information available through the vehicle's rearview mirror system. The Lane Change Aid (LCA) system of the present invention extends the detection capability of the blind spot detection systems of the prior art.

A vehicle lane change aid system, according to an aspect of the invention, includes a detector that is operative to detect the presence of another vehicle adjacent the vehicle, an indicator for providing an indication that a lane change maneuver of the equipped vehicle may affect the other vehicle and a control receiving movement information of the equipped vehicle. The control develops a position history of the equipped vehicle at least as a function of the movement information. The control compares the detected presence of the other vehicle with the position history and provides the indication when a lane change maneuver may affect the other vehicle.

A vehicle lane change aid system, according to an aspect of the invention, includes an imaging device for capturing lane edge images and a control that is responsive to an output of the imaging device to recognize lane edge positions. The control is operable to distinguish between certain types of lane markers. The control may distinguish between dashed-lane markers and non-dashed-line markers.

A vehicle lane change aid system, according to an aspect of the invention, includes an imaging device for capturing lane edge images and a control that is responsive to an output of the imaging device to recognize lane edge positions. The control is operative to determine that the vehicle has departed a lane. The control may notify the driver that a lane has been departed. The control may further include oncoming vehicle monitoring and side object detection.

A vehicle lane change aid system, according to an aspect of the invention, includes a forward-facing imaging device for capturing images of other vehicles and a control that is responsive to an output of the imaging device to determine an imminent collision with another vehicle. The control may include a wireless transmission channel to transmit a safety warning to the other vehicle. The control may also activate a horn or headlights of the equipped vehicle of an imminent collision.

These and other objects, advantages and features of this invention will become apparent upon review of the following specification in conjunction with the drawings.

DESCRIPTION OF THE PREFERRED EMBODIMENT

Figure 1A:
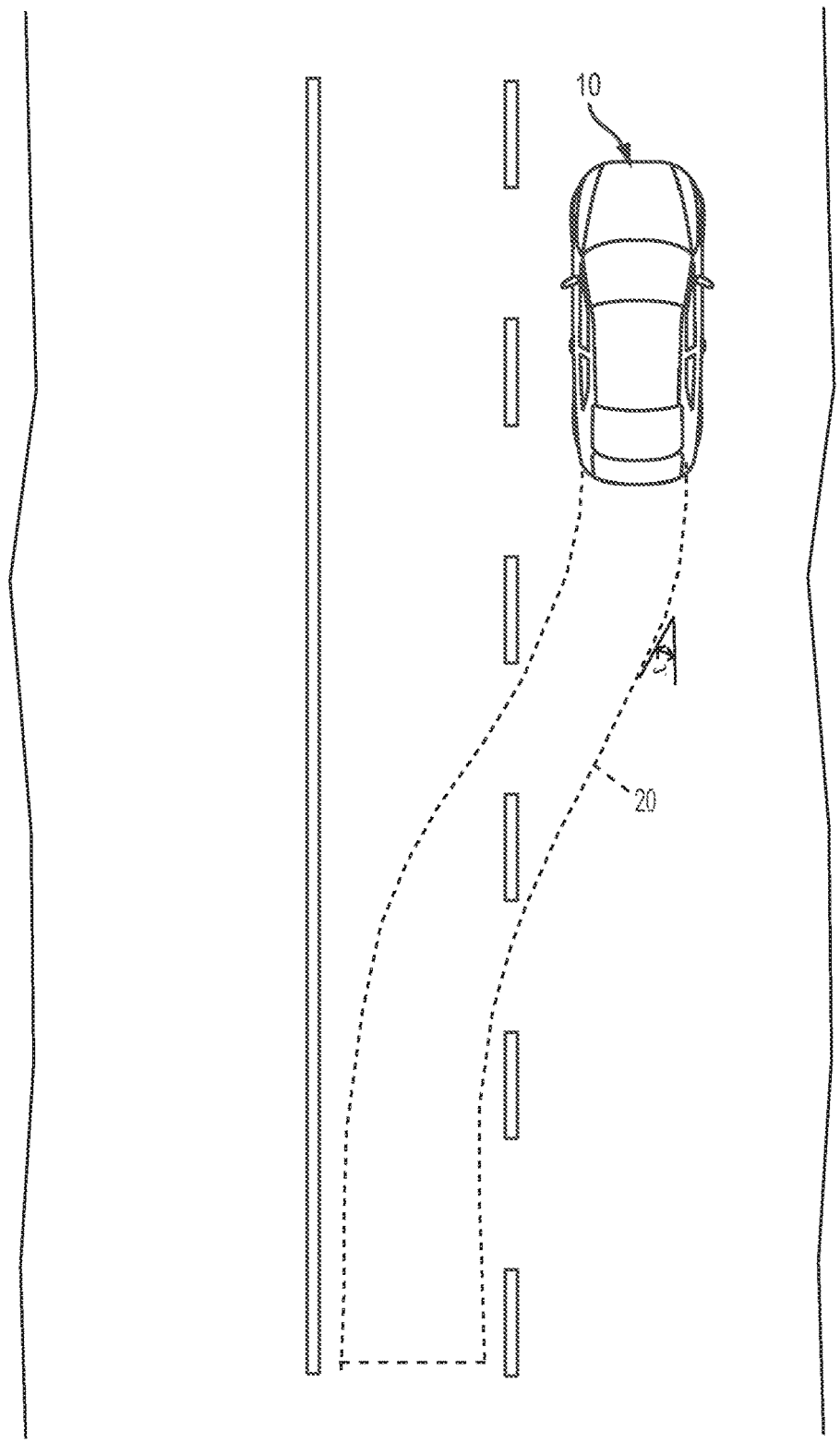
FIGS. 1A-1C are top plan views illustrating a vehicle equipped with a lane change aid system, according to the invention, traveling a straight section of road.

Referring to the drawings and the illustrative embodiments depicted therein, a Lane Change Aid (LCA) system 12 of the present invention as illustrated with a vehicle 10 includes a control 18 and an indicator and/or display system 16 that warns a vehicle operator if an intended, or attempted, lane change maneuver could cause an approaching rearward vehicle to brake and decelerate at an unsafe rate, or that otherwise constitutes a highway hazard. In Lane Change Aid (LCA) system 12, the dimension, in the direction of travel, of a zone 20 to be monitored may be calculated based on an assumed maximum relative velocity between a detecting vehicle and an approaching rearward vehicle, and a safe braking and deceleration assumption. Depending on the assumptions made, the required detection zone may vary in length, such as extending rearward from 50 to 100 m, or more. At 100 m, the road curvature behind the vehicle may have a significant impact on the position of the lane of the detected vehicle, relative to the detecting vehicle. Since it is important to know which lane an approaching rearward vehicle is in, relative to the detecting vehicle, in order to provide the driver an appropriate warning, and to avoid many false warnings, the Lane Change Aid (LCA) system 12 includes developing and maintaining a lane position history 20 for the space rearward of the detecting vehicle.

By combining distance traveled with steering angle, the detecting vehicle path may be plotted. Details of the last approximately 100 m traveled are of value for lane change aids and may be stored by the Lane Change Aid (LCA) system. Data may be stored by several methods including the method described below.

Vehicle speed information in the Lane Change Aid (LCA) system 12 is typically derived from a wheel rotation sensor signal 24, which consists of a number of pulses, n, per revolution of the road wheel, and available on a vehicle data bus 26, such as a CAN or LIN bus, or the like. Sensing and signal detail may vary depending on vehicle design, but for any particular design, a distance, d, traveled between pulses can be established. Also, as each pulse is detected, the current value of the steering angle, $+/-\alpha$, determined by a steering angle encoder 22 may be read from vehicle data bus 26. Again, the sensing and signal detail may vary depending on vehicle design, but, for any particular vehicle design, an effective turning radius, r, for the vehicle can be established.

Image-based blind spot detection devices and lane change aids, generally shown at 14, are but two of a variety of sensing devices and technologies and devices suitable for the purpose of monitoring the local environment in which a vehicle operates. Radar, infrared, sonar, and laser devices are all capable of interrogating the local environment for the presence of other road users or obstacles to be avoided. GPS systems can accurately determine the vehicle position on the earth's surface, and map data can provide detailed information of a mobile local environment. Other wireless communication systems 28 such as short-range wireless communication protocols, such as BLUETOOTH, can provide information such as the position of road works, lane restrictions, or other hazards, which can be translated by on-board vehicle electronics into position data relative to the vehicle position. Lane Change Aid (LCA) system 12 may integrate all the available information from a multiplicity of sensors including non-image-based detectors 14b, such as a radar sensor, such as a Doppler radar sensor, and at least one image-based detector 14a such as a CMOS video camera imaging sensor, and converts the various sensor outputs into a single database with a common format, so that data from various sources, such as a Doppler radar source and a video camera source, may be easily compared, combined and maintained.

Consider a spherical space of radius R, and center (x, y, z)=(0, 0, 0) in Cartesian coordinates or $(r, \theta, \beta=(0,0,0))$ in polar coordinates. It is convenient to describe the space in both coordinate systems since several operations will be used to fill the data space and to maintain it and a choice of systems allows for efficient computation methods. Let the center of this space (0, 0, 0) be at the center of the vehicle's rear axle, or nominal rear axle described by the line which passes through the center of the two rear non-steering wheels. Let the horizontal centerline of the vehicle, in the primary direction of travel, lie on (x, 0, 0), such that positive x values describe the space forward of the center of the vehicle's rear axle. Let the rear axle coincide with (0, y, 0), such that positive values of y describe the space to the right of the vehicle centerline when looking forward. (R, 90, 0) describes the positive y axis. Let positive z values describe the space above the centerline of the rear axle. (R, 0, 90) describes the positive z axis. This "sphere of awareness" 20 moves with the vehicle as it moves through space and provides a common frame of reference for all sensed or otherwise derived data concerning the vehicle's local environment.

Figure 1B:
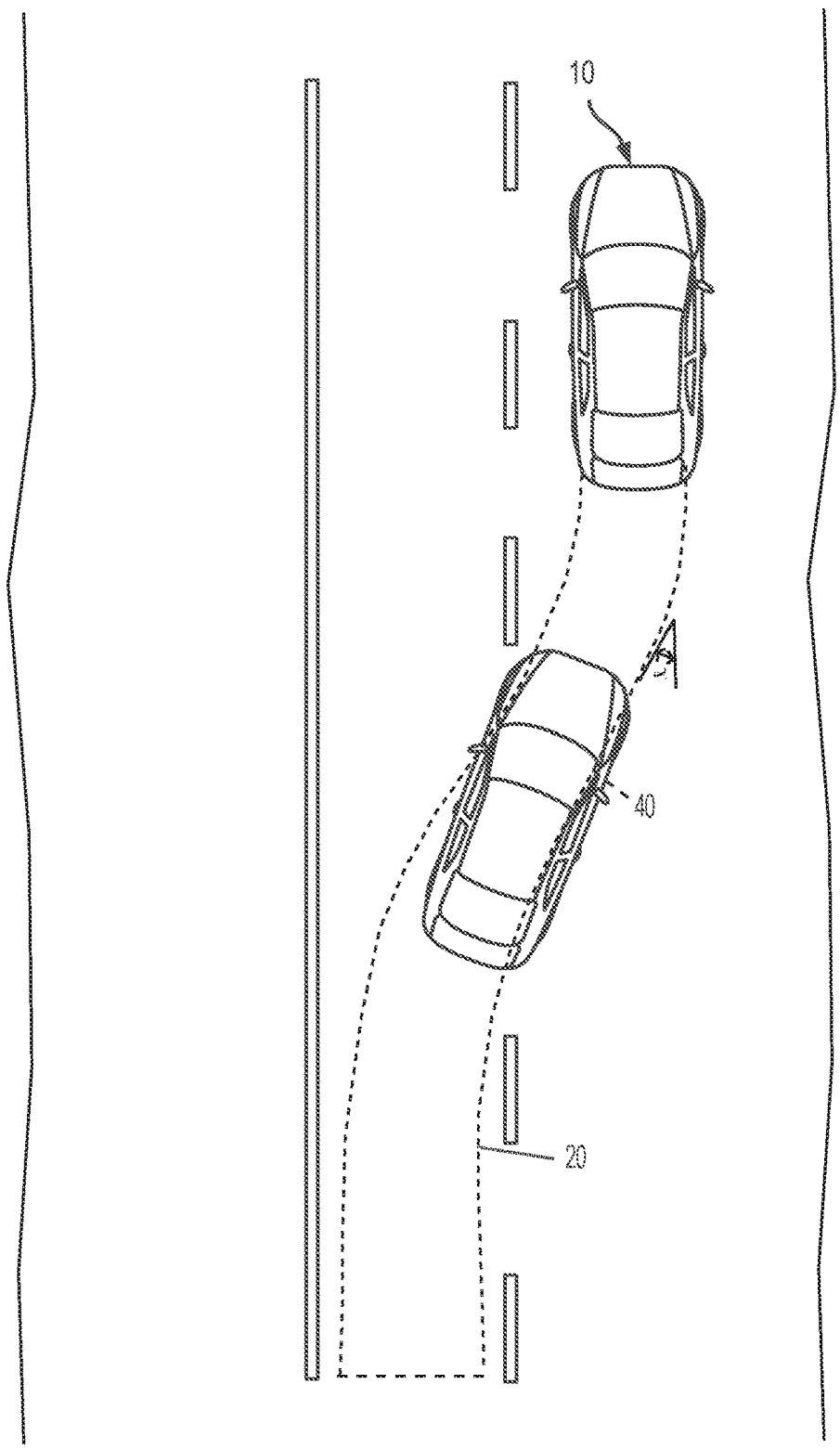
Figure 1C:
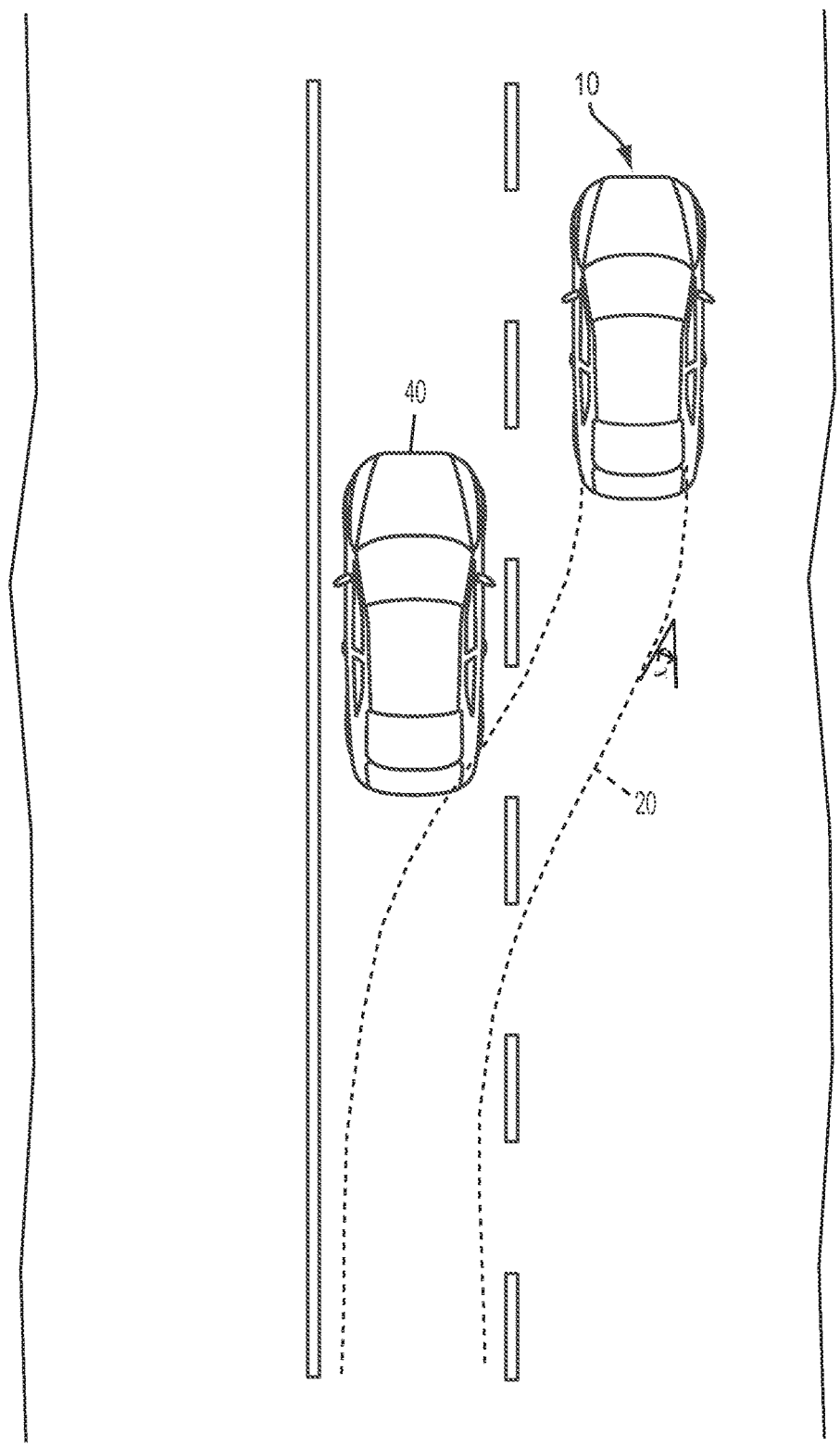
Figure 2:
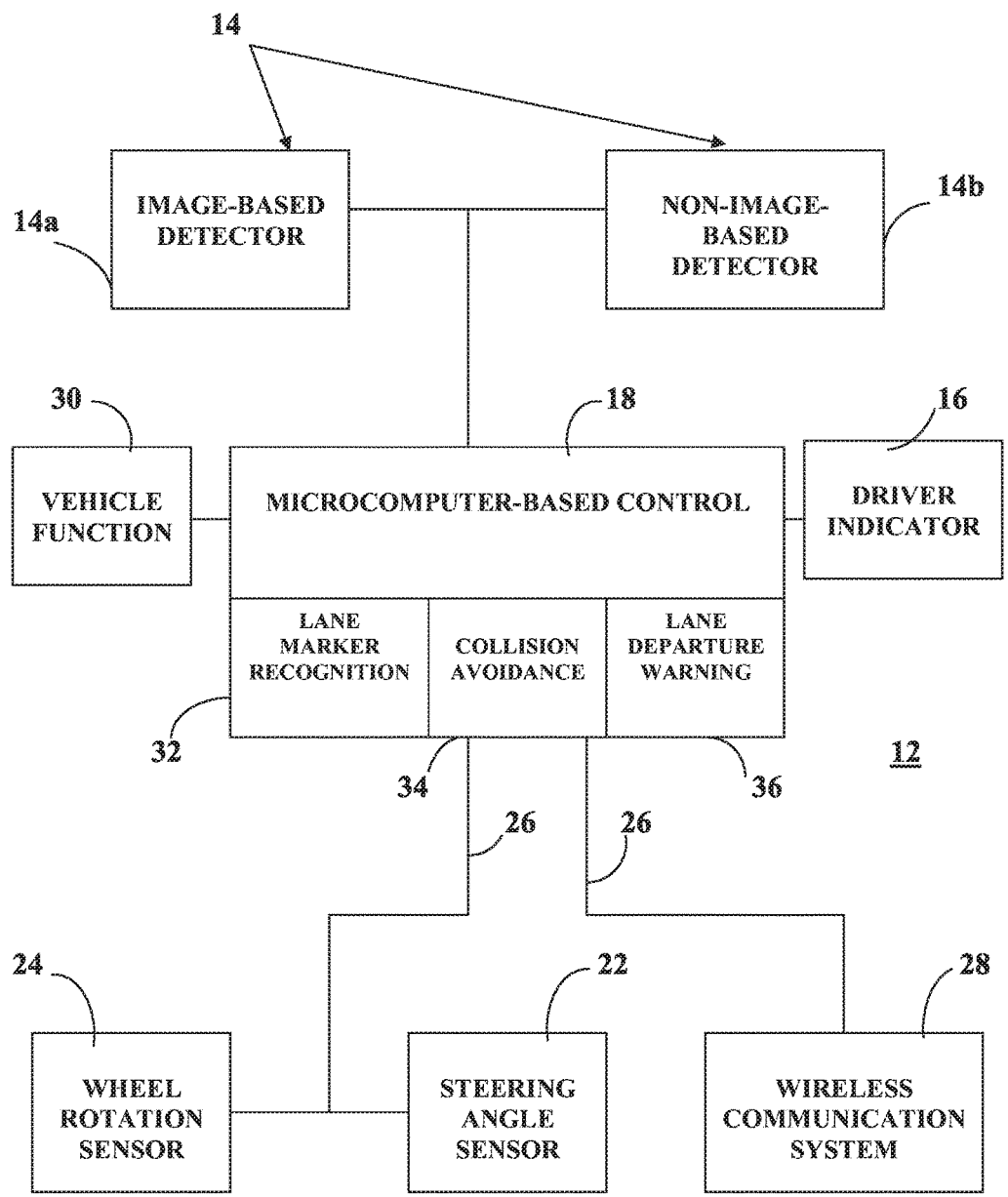
FIG. 2 is a block diagram of a lane change aid system, according to the invention.

For the purpose of storing vehicle path data, which may be used to improve the performance of lane change aid 12, the discussion may be simplified by considering only the horizontal plane. The use of polar coordinates simplifies operations used in this application. The first data point, as the vehicle starts with no history, is at point (0, 0). The steering angle is read from the data bus and stored as $\alpha_0$. When wheel rotation pulse, $p_1$ is detected, steering angle $\alpha_1$ is recorded. Since the distance traveled between wheel pulses is known to be d, a new position for the previous data point can be calculated as $([2(1-\cos \alpha_0)]1/2, (180+\alpha_0))$. This point is stored and recorded as historical vehicle path data. When pulse $p_2$ is detected, the above calculation is repeated to yield $([2(1-\cos \alpha_1)]1/2, (180+\alpha_1))$ as the new position for the previous data point. This requires the repositioning of the original data to $([2(1-\cos \alpha_0)]1/2+[2(1-\cos \alpha_1)]1/2, [(180+\alpha_0)+\alpha_1])$. This process is continued until the distance from the vehicle, R, reaches the maximum required value, such as 100 m in the case of a lane change aid. Data beyond this point is discarded. Thus, a continuous record of the vehicle path for the last 100 m, or whatever distance is used, may be maintained. By maintaining a running record of the path traveled, rearward approaching vehicles detected by a lane change aid image analysis system may be positioned relative to that path as can be seen by comparing the other vehicle 40 in FIGS. 1B and 1C. In FIG. 1B, other vehicle 40 is overlapping zone 20 so an indication of potential conflict may be delayed or discarded. In FIG. 1C, the other vehicle 40 is moving outside of other vehicle 40 and in a blind spot of vehicle 10 so an indication of potential conflict would be given to the driver with indicator 16. Thus, a determination may be made if the approaching vehicle is in the same, adjacent or next but one lane, etc. By this means, the number of inappropriate or unnecessary warnings may be reduced.

Figure 3:
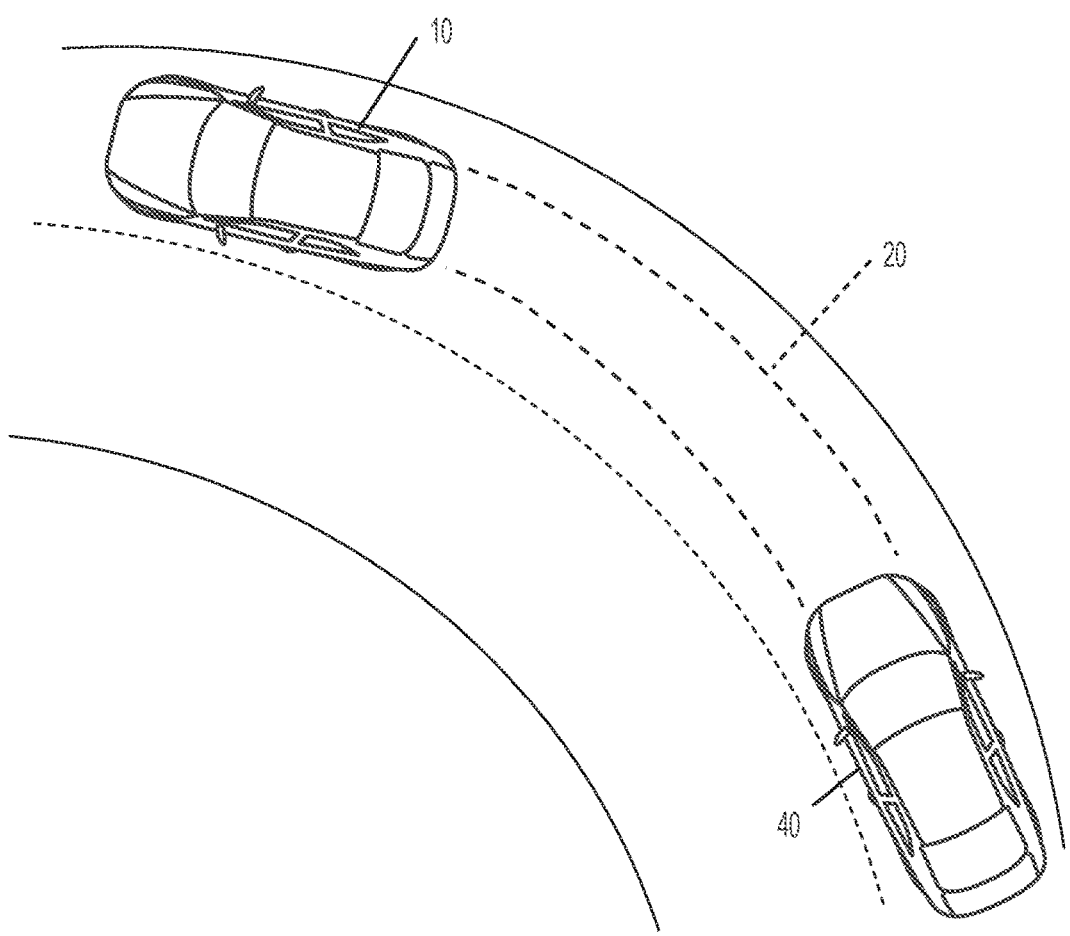
FIG. 3 is a top plan view illustrating a vehicle equipped with a lane change aid system traveling a curved section of road.

Lane change aid system 12 may include a controller, such as a microprocessor including a digital signal processor microcomputer of CPU speed at least about 5 MIPS, more preferably at least about 12 MIPS and most preferably at least about 30 MIPS, that processes inputs from multiple cameras 14a and other sensors 14b and that includes a vehicle path history function whereby, for example, an object, such as a rear-approaching car or motorcycle or truck, or the like, is selected and its presence highlighted to the driver's attention, such as by icons on a dashboard or interior mirror-mounted display, based on the recent history of the side and rear lanes that the host vehicle equipped with the controller of this invention has recently traveled in. An example is over a previous interval of about 60 seconds or less, or over a longer period such as about 3 minutes or more. The vehicle path history function works to determine the lane positioning of an approaching other vehicle, and whether the host vehicle is traveling on, or has recently traveled on, a straight road as illustrated in FIGS. 1A, 1B and 1C, or a curved road portion as illustrated in FIG. 3.

Control 18 may comprise a central video processor module such as is disclosed in commonly assigned provisional patent application Ser. No. 60/309,023, filed Jul. 31, 2001, and utility patent application filed concurrently herewith, now U.S. patent application Ser. No. 10/209,181, filed Jul. 31, 2002, and published Feb. 6, 2003 as U.S. Publication No. US 2003/0025793, the disclosures of which are hereby incorporated herein by reference. Such video processor module operates to receive multiple image outputs from vehicle-mounted cameras, such as disclosed in commonly assigned patent application Ser. No. 09/793,002, filed Feb. 26, 2001, now U.S. Pat. No. 6,690,268, the disclosure of which is hereby incorporated herein by reference, and integrates these in a central processing module to allow reaction to the local vehicle environment. Optionally, and when bandwidth limitations exist that limit the ability to send raw image data, particularly high-resolution images, from a remote camera to a central processing unit across robust transmission means, such as a fiber-optic cable or a high-density wireless link, distributed processing can occur, at least local to some of the image capture sensors. In such an at least partial distributed processing environment, the local processors are adapted to preprocess images captured by the local camera or cameras and any other device such as a Doppler radar sensor viewing a blind spot in an adjacent side lane and to format this preprocessed data into a standard format and transmit this standard formatted data. The data can be transmitted via a wired network or a wireless network or over a vehicle bus system, such as a CAN bus and/or a LIN bus, or the like, to the central processor for effective, centralized mapping and combination of the total local environment around the vehicle. This provides the driver with a display of what is happening in both the right and the left side lanes, and in the lane that the host vehicle is itself traveling in.

In this regard, the vehicle can be provided with a dedicated bus and central processor, as described above, for providing a vehicle environment awareness, which can be both internal such as might be provided by interior cabin or trunk monitors/sensors that determine occupant presence, head position and/or movement, eye movement, air bag deployment, microphone aiming, seat positioning, air conditioning and/or heating targeting, audio controls, and the like, or can be external to the vehicle such as in blind spot detecting or lane change detecting. The present invention includes provision of an automatic environment awareness function that comprises automatic gathering of sensor-derived data collection and transmission in a standard format via a vehicle bus network, the data including data relating to the vehicle environment such as the exterior environment, for example, the presence of rear-approaching traffic in side and rear lanes to the host vehicle as captured by rear-facing CMOS or CCD cameras on the side of the host vehicle, such as included in a side view mirror assembly on either or both sides of the host vehicle and/or as detected by a rear lane/side lane-viewing Doppler radar sensor, and preferably includes processing in a central video processing unit.

The information relating to the external environment can be relayed/displayed to the driver in a variety of ways. For example, a blind-spot vehicle-presence indication can be displayed adjacent the exterior mirror assembly, such as inside the vehicle cabin local to where the exterior mirror assembly is attached to the vehicle door so that the indicator display used, typically an LED flashing light source, or the like, is visible to the driver but not visible to any traffic/drivers exterior to the vehicle, but is cognitively associated with the side of the vehicle to which that particular nearby exterior mirror is attached to, and as disclosed in commonly assigned U.S. Pat. Nos. 5,786,772; 5,929,786 and 6,198,409, the disclosures of which are hereby incorporated herein by reference. Optionally, a vibration transducer can be included in the steering wheel that trembles or otherwise vibrates to tactilely warn the driver of the presence of an overtaking vehicle in a side lane that the driver is using the steering wheel to turn the driver's vehicle into where an overtaking or following vehicle may constitute a collision hazard. Hazard warnings can be communicated to the driver by voice commands and/or audible warnings, and/or by heads-up-displays. The coordinate scheme for data collection of the present invention enables an improved blind spot and/or lane change detection system for vehicles and particularly in busy traffic on a winding, curved road.

The present invention includes the fusion of outputs from video and non-video sensors, such as, for example, a CMOS video camera sensor and a Doppler radar sensor, to allow all-weather and visibility side object detection. The present invention includes the fusion of outputs from video and non-video sensors, such as, for example, a CMOS video camera sensor and a Doppler radar sensor, to allow all-weather and visibility side object detection. The present invention can be utilized in a variety of applications such as disclosed in commonly assigned U.S. Pat. Nos. 5,670,935; 5,949,331; 6,222,447; 6,201,642; 6,097,023; 5,715,093; 5,796,094 and 5,877,897 and commonly assigned patent application Ser. No. 09/793,002 filed Feb. 26, 2001, now U.S. Pat. No. 6,690,268, Ser. No. 09/372,915, filed Aug. 12, 1999, now U.S. Pat. No. 6,396,397, Ser. No. 09/767,939, filed Jan. 23, 2001, now U.S. Pat. No. 6,590,719, Ser. No. 09/776,625, filed Feb. 5, 2001, now U.S. Pat. No. 6,611,202, Ser. No. 09/799,993, filed Mar. 6, 2001, now U.S. Pat. No. 6,538,827, Ser. No. 09/493,522, filed Jan. 28, 2000, now U.S. Pat. No. 6,426,492, Ser. No. 09/199,907, filed Nov. 25, 1998, now U.S. Pat. No. 6,717,610, Ser. No. 08/952,026, filed Nov. 19, 1997, now U.S. Pat. No. 6,498,620, Ser. No. 09/227,344, filed Jan. 8, 1999, now U.S. Pat. No. 6,302,545, International Publication No. WO 96/38319, published Dec. 5, 1996, and International Publication No. WO 99/23828, published May 14, 1999, the disclosures of which are collectively incorporated herein by reference.

Lane change aid system 12 may include a lane marker type recognition algorithm, or capability 32. Lane marker type recognition capability 32 utilizes classifying lane markers as one of many specific types for the purpose of interpreting the original purpose of the lane marker and issuing reliable and meaningful warnings based on this interpretation. As an example, a double line on the left side of a left-hand drive vehicle typically indicates a no-encroachment zone or no passing zone. A solid line with adjacent dashed line will indicate either an ability to pass safely if the dashed line is on the near side of the solid line or a do not encroach zone if the dashed line is on the far side of the solid line. Road edges can be distinctly recognized and classified as no-encroachment zones. Conversely, dashed lines may have no significance to lane departure warning algorithms since they merely indicate lane edge positions. Recognizing dashed lines as such gives the ability to not initiate nuisance warnings. The recognition algorithm can further be enhanced by recognizing road features when lane markers are too weak or missing. Features, such as curbs, road seams, grease or rubber slicks, road signs, vehicles in same, neighboring, and/or opposing lanes when recognized, could be used to interpret lane-vehicle positioning and issue intelligent warning alerts to the driver. Fewer false or nuisance type warnings with improved real warning functionality and speed can be realized with this improvement. Operation under difficult lighting and environmental conditions can be extended.

Note that collision avoidance functionality 34 can optionally be achieved using a forward-facing camera 14a in the present invention. For example, should the forward-looking camera detect an oncoming car likely to collide with the vehicle equipped with the present invention, or if another vehicle tries to pull in front of it, the system of the present invention can issue a warning (visual and/or audible) to one or both drivers involved. Such warning can be flash headlights and/or sound car horn. Similarly, the system can detect that the driver of the vehicle equipped with the present invention is failing to recognize a stop sign and/or a signal light, or some other warning sign and the driver can be warned visually, such as with a warning light at the interior mirror in the vehicle cabin, or audibly, such as via a warning beeper, or tactilely, such as via a rumble/vibration transducer that vibrates the steering wheel to alert the driver of a potential hazard.

System 12 may also include a lane departure warning algorithm, or system 36. For example, when a left-hand drive vehicle equipped with system 10 is making a left-hand turn generally across a line on the road. System 36 can monitor for a lane crossing and combine it with detection of an oncoming vehicle. The system 12 may also calculate closing speed for warning of potential impact of closing vehicles.

Also, the vehicle can be provided on its front fender or elsewhere at the front of the vehicle with a side-looking camera as an image-based detector 14a operable to warn the driver when he/she is making a left turn across lanes of traffic coming from his/her left (left-side warning) and then again when he/she is about to enter traffic lanes with traffic coming from his right (right-side warning). While executing this turn, the system of the present invention may utilize the detection of the lane markers when the driver's car is about to enter the specific lane combined with oncoming vehicle detection as a means of predictive warning before he actually enters the danger zone.

System 12 is also capable of performing one or more vehicle functions 30. For example, should the lane departure warning system 36 detect that the vehicle equipped with the system is intending to make or is making a lane change and the driver has neglected to turn on the appropriate turn signal indicators, then the system performs a vehicle function 30 of automatically turning on the turn signals on the appropriate side of the vehicle.

The lane departure warning system 36 of the present invention is operable to differentiate between solid and dashed lines and double lines on the road being traveled. Also, should the vehicle be equipped with a side object detection (SOD) system such as a Doppler radar unit or a camera vision side object detection system that detects the presence of overtaking vehicles in the adjacent side lane, then the SOD system can work in conjunction with the lane departure warning system such that as the lane departure system detects that the driver is making a lane change into a side lane when the SOD system detects an overtaking vehicle in that same side lane, then the driver is alerted and warned of the possible hazard, such as by a visual, audible and/or tactile alert.

As indicated above, the forward-facing camera can include stoplight or sign detection, and the system can further include a broadcast with wireless communication system 28 on a safety warning band when the forward-facing camera detects the stoplight or sign and determines the vehicle is not going to stop based on current speed and deceleration. This would warn crossing drivers of an unsafe condition. Such alerts can dynamically vary depending on road surface conditions (wet, snow, ice, etc.) as visually detected and determined by the forward-facing, road-monitoring camera. For example, wet or snowy roads would change the distance and/or speed at which it would warn based on camera vision recognition of stoplights and/or stop signs. When approaching a stoplight when it changes or the vehicle does not slow down for the light after the driver was warned, the system can blow the horn and/or flash the lights to warn vehicles at the stoplight of the oncoming vehicle. The car may also broadcast one of the safety alerts radar detectors pick up.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:
1. A driver assistance system for a vehicle, said driver assistance system comprising:
   a vision system comprising a first camera disposed at a vehicle equipped with said driver assistance system, said first camera having a field of view forward of the equipped vehicle that encompasses a road being traveled along by the equipped vehicle;
   wherein the road has at least three lanes comprising (i) a first lane along which the vehicle is traveling, (ii) a second lane immediately adjacent the first lane, and

(iii) a third lane immediately adjacent the second lane at the opposite side of the second lane from the first lane;

a control disposed at or in the equipped vehicle and comprising a data processor;

wherein said data processor comprises an image processor;

wherein image data captured by said first camera is provided to said control and is processed by said image processor;

wherein said data processor processes data at a processing speed of at least 30 MIPS;

wherein, responsive to processing by said image processor of image data captured by said first camera, lane markers on the road being traveled along by the equipped vehicle are detected;

wherein, responsive to processing by said image processor of image data captured by said first camera, said control determines the first, second and third lanes of the road being traveled by the equipped vehicle;

a sensing system operable to detect other vehicles present exterior the equipped vehicle;

wherein said sensing system comprises a second camera disposed at the equipped vehicle and having a field of view at least rearward and sideward of the equipped vehicle as the equipped vehicle travels along the road;

wherein said sensing system further comprises a radar sensor disposed at the equipped vehicle and having a field of sensing at least rearward and sideward of the equipped vehicle as the equipped vehicle travels along the road;

wherein image data captured by said second camera is provided to said control;

wherein radar data generated by said radar sensor is provided to said control;

wherein said control receives vehicle data relating to the equipped vehicle via a vehicle bus of the equipped vehicle;

wherein, responsive at least in part to processing at said data processor of radar data generated by said radar sensor and of image data captured by said second camera, said control detects another vehicle present on the road being traveled along by the equipped vehicle and approaching the equipped vehicle from its rear;

wherein, with the equipped vehicle traveling along the first lane, and responsive at least in part to processing at said data processor of radar data generated by said radar sensor and of image data captured by said second camera, said control determines that the other vehicle is travelling in a next but one lane to the lane the second lane or in the third lane of the road along which the equipped vehicle is travelling;

wherein, responsive to determination that the other vehicle is approaching the equipped vehicle and is traveling in the second lane, and responsive to said control detecting a lane change maneuver of the equipped vehicle toward the second lane, said control generates an alert that a lane change by the equipped vehicle from the first lane to the second lane is not safe; and wherein, responsive to determination that the other vehicle is approaching the equipped vehicle and is traveling in the third lane, and responsive to said control detecting a lane change maneuver of the equipped vehicle toward the second lane, said control determines that a lane change from the first lane to the second lane can proceed without hazard of impact with the other vehicle detected travelling in the third lane.

2. The driver assistance system of claim 1, wherein said control is operable to detect a lane change maneuver of the equipped vehicle to a lane adjacent to the lane the equipped vehicle is travelling along.

3. The driver assistance system of claim 2, wherein said radar sensor comprises a Doppler radar sensor.

4. The driver assistance system of claim 2, wherein, responsive at least in part to processing at said data processor of image data captured by said second camera, said control develops a vehicle path history of the other vehicle.

5. The driver assistance system of claim 4, wherein determination by said control that the lane change can proceed without hazard of impact with the other vehicle detected travelling in the third lane utilizes said vehicle path history.

6. The driver assistance system of claim 1, wherein said radar sensor has a field of sensing to a side of and rearward of the equipped vehicle as the equipped vehicle travels along the road.

7. The driver assistance system of claim 6, wherein said control is operable to detect a lane change maneuver of the equipped vehicle from the first lane to the second lane.

8. The driver assistance system of claim 7, wherein detection of the lane change maneuver by said control is based at least in part on vehicle steering data received at said control via said bus.

9. The driver assistance system of claim 7, wherein, responsive to said control detecting the lane change maneuver of the equipped vehicle, said control determines that the lane change can proceed without hazard of impact with the other vehicle detected approaching from the rear in the third lane.

10. The driver assistance system of claim 9, wherein said vehicle bus system comprises at least one of (a) a CAN bus of the vehicle and (b) a LIN bus of the vehicle.

11. The driver assistance system of claim 10, wherein the other vehicle detected in the third lane is overtaking the equipped vehicle.

12. The driver assistance system of claim 11, wherein said control determines a position history of the other vehicle.

13. The driver assistance system of claim 7, wherein detection of the lane change maneuver by said control is irrespective of activation by a driver of the equipped vehicle of a turn signal indicator of the equipped vehicle.

14. The driver assistance system of claim 1, wherein said vision system further comprises at least one other camera disposed at the equipped vehicle and having a field of view exterior the equipped vehicle, and wherein said sensing system further comprises at least one other radar sensor disposed at the equipped vehicle and having a field of sensing exterior the equipped vehicle, and wherein image data captured by said at least one other camera is provided to and processed at said control, and wherein radar data generated by said at least one other radar sensor is provided to and processed at said control.

15. The driver assistance system of claim 1, wherein said camera comprises a forward-viewing camera disposed in an interior cabin of the equipped vehicle at and behind a windshield of the equipped vehicle and viewing through the windshield to capture image data at least forward of the equipped vehicle.

16. The driver assistance system of claim 15, wherein, responsive at least in part to processing of radar data generated by said radar sensor and of image data captured by said camera, said control determines a hazard of collision of the equipped vehicle with another vehicle.

17. The driver assistance system of claim 16, wherein, responsive at least in part to said control determining said hazard of collision with the other vehicle, said control controls a system of the equipped vehicle to mitigate potential collision with the other vehicle that is in hazard of collision with the equipped vehicle.

18. The driver assistance system of claim 17, wherein, responsive at least in part to said control determining said hazard of collision, said control controls activation of at least one of (i) a horn system of the equipped vehicle to mitigate potential collision with the other vehicle that is in hazard of collision with the equipped vehicle and (ii) a lighting system of the equipped vehicle to mitigate potential collision with the other vehicle that is in hazard of collision with the equipped vehicle.

19. The driver assistance system of claim 17, wherein, responsive at least in part to said control determining said hazard of collision, said control controls a wireless transmission system of the equipped vehicle to transmit a safety warning to the other vehicle that is in hazard of collision with the equipped vehicle.

20. A driver assistance system for a vehicle, said driver assistance system comprising:
a vision system comprising a first camera disposed at a vehicle equipped with said driver assistance system, said first camera having a field of view forward of the equipped vehicle that encompasses a road being traveled along by the equipped vehicle;
wherein the road has at least three lanes comprising (i) a first lane along which the vehicle is traveling, (ii) a second lane immediately adjacent the first lane, and (iii) a third lane immediately adjacent the second lane at the opposite side of the second lane from the first lane;
wherein said first camera comprises a forward-viewing camera disposed in an interior cabin of the equipped vehicle at and behind a windshield of the equipped vehicle and viewing through the windshield to capture image data at least forward of the equipped vehicle;
a control disposed at or in the equipped vehicle and comprising a data processor;
wherein said data processor comprises an image processor;
wherein image data captured by said first camera is provided to said control and is processed by said image processor;
wherein said data processor processes data at a processing speed of at least 30 MIPS;
wherein, responsive to processing by said image processor of image data captured by said first camera, lane markers on the road being traveled along by the equipped vehicle are detected;
wherein, responsive to processing by said image processor of image data captured by said first camera, said control determines the first, second and third lanes of the road being traveled by the equipped vehicle;
a sensing system operable to detect other vehicles present exterior the equipped vehicle;
wherein said sensing system comprises a first radar sensor disposed at the equipped vehicle and having a field of sensing exterior of the equipped vehicle as the equipped vehicle travels along the road;
wherein radar data generated by said first radar sensor is provided to said control;
wherein said control receives vehicle data relating to the equipped vehicle via a vehicle bus of the equipped vehicle;
wherein said vision system further comprises a second camera disposed at the equipped vehicle and having a field of view at least rearward and sideward of the equipped vehicle as the equipped vehicle travels along the road, and wherein said sensing system further comprises a second radar sensor disposed at the equipped vehicle and having a field of sensing at least rearward and sideward the equipped vehicle as the equipped vehicle travels along the road, and wherein image data captured by said second camera is provided to and processed at said control, and wherein radar data generated by said second radar sensor is provided to and processed at said control;
wherein, responsive at least in part to processing at said data processor of radar data generated by at least one of said first and second radar sensors of said sensing system and of image data captured by at least one of said first and second cameras of said vision system, said control determines a hazard of collision of the equipped vehicle with another vehicle;
wherein, with the equipped vehicle traveling along the first lane, and responsive at least in part to processing at said data processor of radar data generated by said radar sensor and of image data captured by said second camera, said control determines that the other vehicle is travelling in the second lane or in the third lane of the road along which the equipped vehicle is travelling;
wherein, responsive to determination that the other vehicle is approaching the equipped vehicle and is traveling in the second lane, and responsive to said control detecting a lane change maneuver of the equipped vehicle toward the second lane, said control generates an alert that a lane change by the equipped vehicle from the first lane to the second lane is not safe;
wherein, responsive to determination that the other vehicle is approaching the equipped vehicle and is traveling in the third lane, and responsive to said control detecting a lane change maneuver of the equipped vehicle toward the second lane, said control determines that a lane change from the first lane to the second lane can proceed without hazard of impact with the other vehicle detected travelling in the third lane; and
wherein, responsive at least in part to said control determining said hazard of collision with the other vehicle, said control controls a system of the equipped vehicle to mitigate potential collision with the other vehicle.

21. The driver assistance system of claim 20, wherein, responsive at least in part to said control determining said hazard of collision, said control controls activation of at least one of (i) a horn system of the equipped vehicle to mitigate potential collision with the other vehicle that is in hazard of collision with the equipped vehicle and (ii) a lighting system of the equipped vehicle to mitigate potential collision with the other vehicle.

22. The driver assistance system of claim 20, wherein, responsive at least in part to said control determining said hazard of collision, said control controls a wireless transmission system of the equipped vehicle to transmit a safety warning to the other vehicle.

23. The driver assistance system of claim 20, wherein the other vehicle is approaching the equipped vehicle from rearward of the equipped vehicle, and wherein said control is operable to detect a lane change maneuver of the equipped vehicle to the second lane the equipped vehicle is travelling along, and wherein detection of the lane change maneuver by said control is based at least in part on vehicle steering data received at said control via said bus.

24. The driver assistance system of claim 23, wherein radar data generated by at least one of said first and second radar sensors of said sensing system and image data captured by at least one of said first and second cameras of said vision system are fused at said control.

25. The driver assistance system of claim 23, wherein radar data generated by at least one of said first and second radar sensors of said sensing system and image data captured by said first camera of said vision system are fused at said control.

26. The driver assistance system of claim 23, wherein said first radar sensor has a field of sensing to a side of and rearward of the equipped vehicle as the equipped vehicle travels along the road, and wherein radar data generated by said first radar sensor of said sensing system and image data captured by at least one of said first and second cameras of said vision system are fused at said control.

27. The driver assistance system of claim 23, wherein, responsive at least in part to processing at said data processor of at least one of (i) radar data generated by at least one of said first and second radar sensors of said sensing system and (ii) image data captured by at least one of said first and second cameras of said vision system, said control determines that the other vehicle is travelling in the third lane.

28. A driver assistance system for a vehicle, said driver assistance system comprising:
- a vision system comprising a first camera disposed at a vehicle equipped with said driver assistance system, said first camera having a field of view that encompasses a road being traveled along by the equipped vehicle;
- wherein said first camera comprises a forward-viewing camera disposed in an interior cabin of the equipped vehicle at and behind a windshield of the equipped vehicle and viewing through the windshield to capture image data at least forward of the equipped vehicle;
- wherein the road has at least three lanes comprising (i) a first lane along which the vehicle is traveling, (ii) a second lane immediately adjacent the first lane, and (iii) a third lane immediately adjacent the second lane at the opposite side of the second lane from the first lane;
- a control disposed at or in the equipped vehicle and comprising a data processor;
- wherein said data processor comprises an image processor;
- wherein image data captured by said first camera is provided to said control and is processed by said image processor;
- wherein said data processor processes data at a processing speed of at least 30 MIPS;
- wherein, responsive to processing by said image processor of image data captured by said first camera, lane markers on the road being traveled along by the equipped vehicle are detected;
- wherein, responsive to processing by said image processor of image data captured by said first camera, said control determines the first, second and third lanes of the road being traveled by the equipped vehicle;
- a sensing system operable to detect other vehicles present exterior the equipped vehicle;
- wherein said sensing system comprises a first radar sensor disposed at the equipped vehicle and having a field of sensing exterior of the equipped vehicle as the equipped vehicle travels along the road;
- wherein radar data generated by said first radar sensor is provided to said control;
- wherein said control receives vehicle data relating to the equipped vehicle via a vehicle bus of the equipped vehicle;
- wherein said first radar sensor has a field of sensing at least to a side of and rearward of the equipped vehicle as the equipped vehicle travels along the road;
- wherein said sensing system further comprises a second camera disposed at the equipped vehicle and having a field of view at least rearward and sideward of the equipped vehicle as the equipped vehicle travels along the road;
- wherein image data captured by said second camera is provided to said control;
- wherein, responsive at least in part to processing at said data processor of radar data generated by said first radar sensor and of image data captured by said second camera, said control detects another vehicle present on the road being traveled along by the equipped vehicle that is approaching the equipped vehicle from rearward of the equipped vehicle;
- wherein said control is operable to detect a lane change maneuver of the equipped vehicle toward the second lane;
- wherein detection of the lane change maneuver by said control is based at least in part on vehicle steering data received at said control via said bus;
- wherein, responsive to said control detecting a lane change maneuver of the equipped vehicle, said control determines that the lane change can proceed without hazard of impact with the other vehicle approaching the equipped vehicle from rearward of the equipped vehicle;
- wherein, with the equipped vehicle traveling along the first lane, and responsive at least in part to processing at said data processor of radar data generated by said first radar sensor and of image data captured by said second camera, said control determines that the other vehicle is travelling in the second lane or in the third lane of the road along which the equipped vehicle is travelling;
- wherein, responsive to determination that the other vehicle is approaching the equipped vehicle and is traveling in the second lane, and responsive to said control detecting a lane change maneuver of the equipped vehicle toward the second lane, said control generates an alert that a lane change by the equipped vehicle from the first lane to the second lane is not safe; and
- wherein, responsive to determination that the other vehicle is approaching the equipped vehicle and is traveling in the third lane, and responsive to said control detecting a lane change maneuver of the equipped vehicle toward the second lane, said control determines that a lane change from the first lane to the second lane can proceed without hazard of impact with the other vehicle detected travelling in the third lane.

29. The driver assistance system of claim 28, wherein said vehicle bus system comprises a CAN bus of the equipped vehicle.

30. The driver assistance system of claim 28, wherein said control determines a position history of the other vehicle approaching the equipped vehicle from rearward of the equipped vehicle.

31. The driver assistance system of claim 28, wherein detection of the lane change maneuver by said control is irrespective of activation by a driver of the equipped vehicle of a turn signal indicator of the equipped vehicle.

32. The driver assistance system of claim 28, wherein said sensing system further comprises a second radar sensor disposed at the equipped vehicle and having a field of sensing exterior the equipped vehicle, and wherein image data captured by said second camera is provided to and processed at said control, and wherein radar data generated by said second radar sensor is provided to and processed at said control.

33. The driver assistance system of claim 32, wherein, responsive at least in part to processing of radar data generated by at least one of said first and second radar sensors of said sensing system and of image data captured by at least one of said first and second cameras of said vision system, said control determines a hazard of collision of the equipped vehicle with the other vehicle approaching the equipped vehicle from rearward of the equipped vehicle.

34. The driver assistance system of claim 33, wherein, responsive at least in part to said control determining said hazard of collision with the other vehicle approaching the equipped vehicle from rearward of the equipped vehicle, said control controls a system of the equipped vehicle to mitigate potential collision with the other vehicle approaching the equipped vehicle from rearward of the equipped vehicle.

35. The driver assistance system of claim 34, wherein radar data generated by at least one of said first and second radar sensors of said sensing system and image data captured by at least one of said first and second cameras of said vision system are fused at said control.

36. The driver assistance system of claim 34, wherein radar data generated by at least one of said first and second radar sensors of said sensing system and image data captured by said first camera of said vision system are fused at said control.

37. The driver assistance system of claim 34, wherein radar data generated by said first radar sensor of said sensing system and image data captured by at least one of said first and second cameras of said vision system are fused at said control.

* * * * *

UNITED STATES PATENT AND TRADEMARK OFFICE
CERTIFICATE OF CORRECTION

PATENT NO. : 10,099,610 B2
APPLICATION NO. : 15/289341
DATED : October 16, 2018
INVENTOR(S) : Kenneth Schofield It is certified that error appears in the above-identified patent and that said Letters Patent is hereby corrected as shown below:

Column 9
Line 51, Claim 1, remove "a next but one lane to the lane" after "travelling in"

Signed and Sealed this
Eleventh Day of December, 2018

Andrei Iancu
*Director of the United States Patent and Trademark Office*